(No Model.)
H. FAIJA.
MACHINE FOR TESTING CEMENT.
No. 317,752. Patented May 12, 1885.
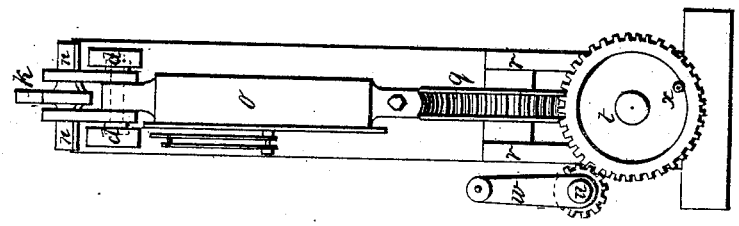
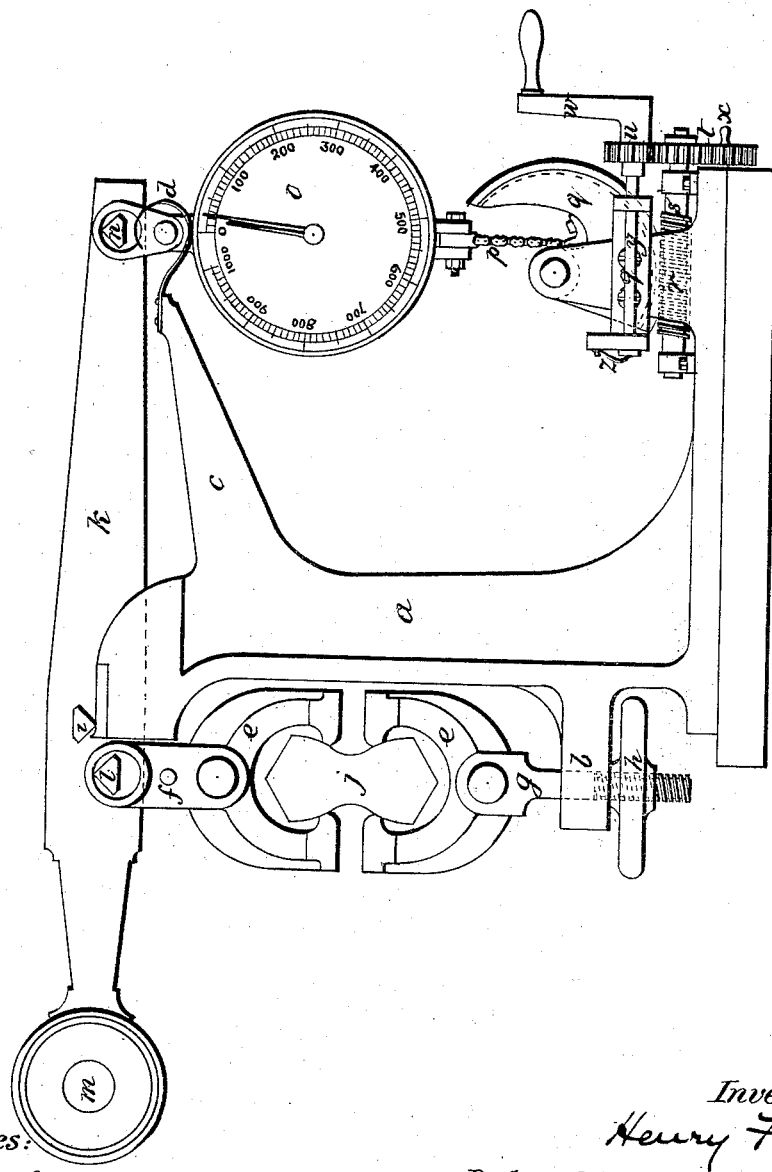
Witnesses:
U. W. Cook.
G. W. Breck.
Inventor:
Henry Faija
By his Attorneys
Curtis & Crocker.

United States Patent Office.

HENRY FAIJA, OF WESTMINSTER, COUNTY OF MIDDLESEX, ENGLAND.

MACHINE FOR TESTING CEMENT.

SPECIFICATION forming part of Letters Patent No. 317,752, dated May 12, 1885.

Application filed February 18, 1885. (No model.)

*To all whom it may concern:*

Be it known that I, HENRY FAIJA, a subject of the Queen of Great Britain and Ireland, residing at Westminster, in the county of Middlesex, Kingdom of Great Britain and Ireland, have invented a new and useful Improved Machine or Apparatus for Testing the Strength of Cement and other Substances, of which the following is a specification.

My invention has for its object to produce a simple compact and efficient machine whereby the strength of cement and various other solid substances may be readily tested. In a machine according to my invention for such purposes the steelyard or lever through which the strain is exerted upon the material to be tested is worked through a spring-balance that indicates the strain. The gear for actuating the steelyard or lever through the spring-balance is so contrived that the operating-handle can be readily thrown out of gear, so as to enable the spring-balance indicator to be rapidly returned to zero. A recoil spring or springs is or are provided for receiving the shock due to the sudden release of the steelyard or lever and recoil of the spring-balance on breakage of a piece of material tested.

Referring to the accompanying sheet of drawings, Figure 1 represents in side elevation, and Fig. 2 in end elevation, a machine embodying my improvements.

$a$ is an upright or standard on which the steelyard $k$ rests, and which has a projection, $b$, that carries the lower clip. It has also a projecting arm, $c$, on the end of which a recoil-spring, $d$, is fixed. The two clips $e\ e$, which hold the test-piece $j$, are respectively fixed—the upper one to the steelyard $k$ by means of double links $f$, hanging on a knife-edge, $l$, and the lower one by means of the forked pin $g$, which fits loosely in a square hole in $b$, and which is screwed on the end to receive the nut-wheel $h$. The wheel $h$ works against the lower side of $b$, and the arrangement allows of the adjustment of the distance apart of the clips to suit the test-piece $j$. The steelyard $k$ has at one end a balance-weight, $m$, and at the other, on the knife-edge $n$, is hung the spring-balance $o$. By means of a chain or rope, $p$, the spring-balance is attached to a drum part wheel or segment, $q$. These work on a center or axle in the uprights $r\ r$, which are fixed to the standard $a$. The segment $q$ is actuated by the worm $s$. The strain may be conveniently put on the test-piece $j$ by turning this worm, or the power required to apply the strain and the speed at which the strain is applied may be reduced by the combination of the wheel and pinion $t$ and $u$, the handle $w$ being on the same spindle as the pinion $u$. When this gearing is adopted, I make the spindle $y$, on which the pinion $u$ is keyed, to slide in its journals, so that the pinion $u$ may be put out of gear with the wheel $t$ by pushing the spring $z$ or equivalent stop-piece on one side. The object of this is that whereas the strain may be put upon the test-piece slowly the balance-indicator can, on the other hand, be returned to zero quickly by throwing the pinion out of gear and turning wheel $t$ by handle $x$.

The action of the machine is as follows: The handle $w$ is turned until the segment $q$ is in the position shown in Fig. 1. When the chain or rope $p$ is slack, and the yard is evenly balanced on the knife-edges $i$, the wheel $h$ is screwed down the thread so that the clips $e\ e$ may be brought together, and the piece to be tested, $j$, put in between the jaws of the clips $e\ e$. The link $g$, bringing with it the lower clip, is then brought down by screwing the wheel $h$ against $b$ until the steelyard $k$ is level. The handle $w$ is then turned, and the spring-balance gradually pulled down until the strain tears the test-piece asunder. The loose pointer shows on the dial of the balance the strain at which the test-piece broke. Immediately the test-piece is broken the end of steelyard $k$ carrying the spring-balance falls, and is caught by the projecting ends of the knife-edges $n$, resting on the spring $d$.

The drawings show a machine with clips arranged to test cement, and the test-piece $j$ is an ordinary cement test piece or briquette of one-inch section. The spring-balance is tested and scaled up to one hundred pounds, and the proportion of the steelyard $k$ is as ten to one, so that the ultimate strain possible is one thousand pounds; but it is evident that with differently arranged clips the machine can be arranged to test the strength of any material, and that by adopting another balance or different proportion of leverage in the steelyard $k$ much greater or more delicate strains can be dealt with.

What I claim is—

1. In a machine for testing the strength of cement and other substances, the combination, with a steelyard or lever and means connecting it with the cement or material to be tested whereby the strain is exerted through said lever upon the material, of a spring-balance and means for operating said steelyard or lever through said spring-balance, so that the latter shall indicate the breaking strain of the material tested, substantially as described.

2. In a machine for testing the strength of cement and other substances, the combination of a steelyard or lever, through which the strain is to be exerted upon material to be tested, a spring-balance, and means for operating said steelyard through said spring-balance and for readily throwing the operating-handle out of gear with the machine, so as to enable the spring-balance indicator to be rapidly returned to zero, substantially as described.

3. In a machine for testing the strength of cement and other substances, the combination of a steelyard or lever, $k$, spring-balance $o$, linked or connected to said steelyard or lever, chain, or connection $p$, part wheel or toothed segment $q$, worm $s$, toothed or gear wheel $t$, pinion $u$, shaft $y$, movable endwise, stop or spring $z$, and operating-handle or its equivalent, substantially as described.

4. In a machine for testing the strength of cement and other substances, the combination of a steelyard or lever through which the strain is to be exerted upon material to be tested, a spring-balance, means for operating said steelyard or lever through said spring-balance, and a recoil-spring (or springs) for receiving the shock due to the sudden release of the steelyard or lever and recoil of the spring-balance on breakage of a piece of material tested, substantially as described.

5. The machine for testing the strength of cement and other substances, comprising upright or standard $a$, with projections $b$ and $c$, clips $e$ $e$, their adjusting-screw $g$, and nut-wheel $h$, links $f$, steelyard or lever $k$, with counter-weight $m$, spring-balance $o$, recoil-spring $d$, chain or connection $p$, part wheel or segment $q$, worm $s$, toothed or gear wheel $t$, driving-pinion $u$, shaft $y$, movable endwise, and stop or spring $z$, all substantially as described.

HENRY FAIJA.

Witnesses:
  WM. THOS. MARSHALL,
  L. AUGS. EUSTACE,
*Both of 2 Popes Head Alley, Cornhill, London, Gentlemen.*